(12) United States Patent
Yee et al.

(10) Patent No.: US 9,953,143 B2
(45) Date of Patent: Apr. 24, 2018

(54) SOFTWARE IDENTIFIER BASED CORRELATION

(75) Inventors: John Leong Yee, San Mateo, CA (US); Jason Aron Alonzo, Fair Oaks, CA (US); Umesh Madhav Apte, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2140 days.

(21) Appl. No.: 12/151,205

(22) Filed: May 5, 2008

(65) Prior Publication Data

US 2009/0276269 A1    Nov. 5, 2009

(51) Int. Cl.
| | |
|---|---|
| G06F 21/10 | (2013.01) |
| G06Q 10/08 | (2012.01) |
| G06F 9/44 | (2018.01) |
| G06Q 10/06 | (2012.01) |
| G06Q 10/10 | (2012.01) |
| G06Q 30/00 | (2012.01) |

(52) U.S. Cl.
CPC .............. *G06F 21/105* (2013.01); *G06F 8/70* (2013.01); *G06F 21/10* (2013.01); *G06Q 10/063* (2013.01); *G06Q 10/087* (2013.01); *G06Q 10/10* (2013.01); *G06Q 30/018* (2013.01); *G06F 2221/07* (2013.01)

(58) Field of Classification Search
USPC ......................................................... 705/59
See application file for complete search history.

(56) References Cited

U.S. PATENT DOCUMENTS

| | | | | | |
|---|---|---|---|---|---|
| 5,371,792 | A | * | 12/1994 | Asai ........................ | G06F 21/10 369/53.21 |
| 5,379,433 | A | * | 1/1995 | Yamagishi .............. | G06F 21/10 340/5.31 |
| 5,878,401 | A | * | 3/1999 | Joseph ................. | G06Q 10/087 705/22 |
| 5,991,802 | A | * | 11/1999 | Allard ..................... | G06F 9/548 709/219 |
| 6,041,411 | A | * | 3/2000 | Wyatt ..................... | G06F 21/10 380/27 |
| 6,055,573 | A | * | 4/2000 | Gardenswartz ........ | G06Q 30/02 709/219 |
| 6,056,786 | A | * | 5/2000 | Rivera .................. | G06F 21/105 709/229 |

(Continued)

*Primary Examiner* — Mamon Obeid
(74) *Attorney, Agent, or Firm* — Tarolli, Sundheim, Covell & Tummino LLP

(57) ABSTRACT

Systems, methods, and other embodiments associated with software identifier based correlation are described. One example system includes an identifier data store to store a first identifier that uniquely identifies a discovered instance of a software title installed in an enterprise. The first identifier is discoverable from the discovered instance and may be provided by a discovery logic. The second identifier identifies a known instance of a software title associated with the enterprise and is provided from an enterprise resource planning (ERP) data store by an ERP logic. The example system may also include a correlation logic to identify a correlation between the discovered instance and the known instance based on a relationship between the identifiers. The example system may also include an update logic to selectively update a value in the ERP data store based on the correlation.

23 Claims, 6 Drawing Sheets

(56) References Cited

U.S. PATENT DOCUMENTS

| | | | | |
|---|---|---|---|---|
| 6,226,618 B1* | 5/2001 | Downs | G06F 21/10 | 380/279 |
| 6,249,773 B1* | 6/2001 | Allard | G06Q 30/06 | 705/26.8 |
| 6,304,923 B1* | 10/2001 | Klein | G06F 13/18 | 710/113 |
| 6,324,649 B1* | 11/2001 | Eyres | G06F 21/121 | 702/119 |
| 6,381,587 B1* | 4/2002 | Guzelsu | G06Q 20/102 | 26/34 |
| 6,484,182 B1* | 11/2002 | Dunphy | G06F 17/30958 | 700/231 |
| 6,587,888 B1* | 7/2003 | Chieu | G06F 9/468 | 719/313 |
| 6,615,278 B1* | 9/2003 | Curtis | G06F 9/44505 | 719/310 |
| 6,711,683 B1* | 3/2004 | Laczko, Sr. | G06F 21/10 | 348/E5.004 |
| 6,714,797 B1* | 3/2004 | Rautila | G06Q 20/32 | 345/901 |
| 6,920,567 B1* | 7/2005 | Doherty | G06F 21/10 | 707/999.104 |
| 6,961,858 B2* | 11/2005 | Fransdonk | G06F 21/10 | 380/281 |
| 7,020,635 B2* | 3/2006 | Hamilton | G06Q 20/00 | 705/51 |
| 7,050,753 B2* | 5/2006 | Knutson | G09B 5/00 | 434/322 |
| 7,080,049 B2* | 7/2006 | Truitt | G06Q 20/16 | 380/30 |
| 7,090,128 B2* | 8/2006 | Farley | H04L 67/2823 | 235/384 |
| 7,107,462 B2* | 9/2006 | Fransdonk | G06Q 20/12 | 380/282 |
| 7,124,125 B2* | 10/2006 | Cook | G06F 17/30038 | |
| 7,150,045 B2* | 12/2006 | Koelle | G06F 21/552 | 380/201 |
| 7,237,121 B2* | 6/2007 | Cammack | G06F 21/10 | 380/255 |
| 7,401,291 B2* | 7/2008 | Ramaley | G06Q 10/10 | 715/229 |
| 7,450,734 B2* | 11/2008 | Rodriguez | G06F 17/30997 | 382/100 |
| 7,484,660 B2* | 2/2009 | Tanase | G06Q 30/02 | 235/375 |
| 7,516,492 B1* | 4/2009 | Nisbet | G06F 21/554 | 707/999.001 |
| 7,587,502 B2* | 9/2009 | Crawford | A63F 13/12 | 463/42 |
| 7,627,897 B2* | 12/2009 | Peled | G06F 17/30017 | 726/22 |
| 7,711,586 B2* | 5/2010 | Aggarwal | G06Q 10/02 | 700/14 |
| 7,756,291 B2* | 7/2010 | Lennington | G06F 17/30247 | 358/3.28 |
| 7,831,457 B2* | 11/2010 | Varadarajan | G06Q 10/0631 | 705/1.1 |
| 7,837,111 B2* | 11/2010 | Yang | G06Q 50/22 | 235/375 |
| 7,904,608 B2* | 3/2011 | Price | G06F 8/65 | 710/10 |
| 7,954,151 B1* | 5/2011 | Nisbet | G06F 21/554 | 713/154 |
| 7,958,087 B2* | 6/2011 | Blumenau | G06F 17/30085 | 707/610 |
| 7,992,204 B2* | 8/2011 | Shraim | H04L 12/585 | 726/22 |
| 7,996,374 B1* | 8/2011 | Jones | G06Q 10/10 | 707/694 |
| 8,301,529 B1* | 10/2012 | Anderson | G06Q 40/02 | 705/35 |
| 8,321,352 B1* | 11/2012 | Rameshkumar | G06F 21/12 | 705/51 |
| 8,321,940 B1* | 11/2012 | Pereira | G06F 21/00 | 726/23 |
| 8,458,099 B2* | 6/2013 | Shear | G06Q 10/06 | 705/39 |
| 9,582,830 B2* | 2/2017 | Johns | G06Q 20/108 | |
| 9,652,303 B2* | 5/2017 | McKeeth | G06F 9/544 | |
| 2001/0051996 A1* | 12/2001 | Cooper | G06Q 10/10 | 709/217 |
| 2002/0035524 A1* | 3/2002 | Husslage | G06Q 10/087 | 705/28 |
| 2002/0083070 A1* | 6/2002 | Shuster | G06F 21/6218 | |
| 2002/0083077 A1* | 6/2002 | Vardi | G06F 17/30554 | |
| 2002/0087885 A1* | 7/2002 | Peled | G06F 17/30017 | 726/26 |
| 2003/0056103 A1* | 3/2003 | Levy | G06F 21/10 | 713/176 |
| 2003/0056107 A1* | 3/2003 | Cammack | G06F 21/10 | 713/189 |
| 2003/0167173 A1* | 9/2003 | Levy | G06F 17/30017 | 704/273 |
| 2003/0182206 A1* | 9/2003 | Hendrix | G06Q 30/0601 | 705/26.1 |
| 2003/0187760 A1* | 10/2003 | Matsumoto | G06Q 30/04 | 705/34 |
| 2003/0191710 A1* | 10/2003 | Green | G06Q 20/102 | 705/40 |
| 2004/0044901 A1* | 3/2004 | Serkowski | G06F 21/121 | 726/4 |
| 2004/0210707 A1* | 10/2004 | Ohara | G06F 21/79 | 711/103 |
| 2005/0004873 A1* | 1/2005 | Pou | G06F 21/10 | 705/51 |
| 2005/0097059 A1* | 5/2005 | Shuster | G06Q 30/06 | 705/59 |
| 2005/0120357 A1* | 6/2005 | Eschenroeder | G06F 11/3404 | 719/317 |
| 2005/0138599 A1* | 6/2005 | Hazzard | G06Q 10/0631 | 717/101 |
| 2005/0198061 A1* | 9/2005 | Robinson | H04L 67/104 | |
| 2005/0240766 A1* | 10/2005 | Ishige | G06F 21/608 | 713/175 |
| 2005/0268102 A1* | 12/2005 | Downey | H04L 9/32 | 713/176 |
| 2006/0129788 A1* | 6/2006 | Maeda | G06F 9/4416 | 713/1 |
| 2006/0167882 A1* | 7/2006 | Aydar | G06F 21/10 | |
| 2007/0055689 A1* | 3/2007 | Rhoads | G06F 17/30026 | |
| 2007/0061877 A1* | 3/2007 | Sima | H04L 63/12 | 726/12 |
| 2007/0162428 A1* | 7/2007 | Williams | G06F 17/30056 | |
| 2007/0203841 A1* | 8/2007 | Maes | H04L 63/08 | 705/52 |
| 2007/0261112 A1* | 11/2007 | Todd | G06F 21/577 | 726/11 |
| 2007/0271162 A1* | 11/2007 | Shuster | G06Q 30/04 | 705/34 |
| 2007/0289028 A1* | 12/2007 | Vaughan | G06F 21/10 | 726/30 |
| 2007/0297340 A1* | 12/2007 | Maes | H04L 12/14 | 370/252 |
| 2008/0114695 A1* | 5/2008 | Gutierrez | G06Q 30/0185 | 705/59 |
| 2008/0134049 A1* | 6/2008 | Gupta | G06F 9/4843 | 715/738 |
| 2008/0148253 A1* | 6/2008 | Badwe | G06F 21/10 | 717/174 |
| 2008/0152146 A1* | 6/2008 | Conrado | G06F 21/10 | 380/278 |
| 2008/0201541 A1* | 8/2008 | Madter | G06F 21/575 | 711/164 |
| 2008/0209491 A1* | 8/2008 | Hasek | H04N 7/17318 | 725/114 |
| 2008/0222732 A1* | 9/2008 | Caldwell | G06F 21/125 | 726/26 |

(56) References Cited

U.S. PATENT DOCUMENTS

| | | | |
|---|---|---|---|
| 2008/0249961 A1* | 10/2008 | Harkness | G06Q 30/0283 705/400 |
| 2009/0007274 A1* | 1/2009 | Martinez | G06F 21/10 726/27 |
| 2009/0018895 A1* | 1/2009 | Weinblatt | G06Q 30/02 705/7.29 |
| 2009/0019089 A1* | 1/2009 | Apte | G06Q 10/087 |
| 2009/0031286 A1* | 1/2009 | Yee | G06Q 10/10 717/120 |
| 2009/0037558 A1* | 2/2009 | Stone | G06F 21/10 709/218 |
| 2009/0044246 A1* | 2/2009 | Sheehan | H04N 21/2221 725/146 |
| 2009/0083132 A1* | 3/2009 | Doganaksoy | G06F 21/10 705/7.29 |
| 2009/0113397 A1* | 4/2009 | Wright, Sr. | G06F 21/552 717/127 |
| 2009/0119675 A1* | 5/2009 | Higgins | G06F 17/30896 719/311 |
| 2009/0132310 A1* | 5/2009 | Shear | G06Q 10/06 705/79 |
| 2009/0175538 A1* | 7/2009 | Bronstein | G06F 17/30799 382/173 |
| 2009/0192922 A1* | 7/2009 | Hahn-Carlson | G06Q 10/087 705/28 |
| 2009/0228396 A1* | 9/2009 | Miller | G06Q 30/06 705/59 |
| 2009/0254553 A1* | 10/2009 | Weiskopf | G06F 17/30864 |
| 2009/0276269 A1* | 11/2009 | Yee | G06Q 10/063 705/7.11 |
| 2010/0153241 A1* | 6/2010 | Rucker | G06Q 10/087 705/30 |
| 2010/0218260 A1* | 8/2010 | Schwartz | G06F 21/645 726/26 |
| 2010/0235256 A1* | 9/2010 | Kang | G06Q 10/10 705/26.1 |
| 2010/0251379 A1* | 9/2010 | Myers | G06F 21/105 726/26 |
| 2010/0257612 A1* | 10/2010 | McGuire | G06Q 20/383 726/26 |
| 2010/0333210 A1* | 12/2010 | Fisher | G06Q 10/10 726/26 |
| 2011/0191766 A1* | 8/2011 | Wookey | G06F 8/68 717/175 |
| 2011/0258065 A1* | 10/2011 | Fordyce, III | G06Q 10/10 705/26.1 |
| 2012/0260312 A1* | 10/2012 | Backman | H04L 63/12 726/3 |
| 2012/0323792 A1* | 12/2012 | Peterson | H04H 60/63 705/51 |
| 2013/0109307 A1* | 5/2013 | Reisgies | H04L 63/08 455/41.1 |
| 2014/0358802 A1* | 12/2014 | Biswas | G06F 21/128 705/310 |
| 2015/0026826 A1* | 1/2015 | Allegri | H04L 63/10 726/29 |

\* cited by examiner

SOFTWARE IDENTIFIER BASED CORRELATION

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Software license compliance continues to be an important issue for both software vendors and software users. Vendors seek to insure proper compensation for providing their products while users seek to prevent liability for unauthorized use. Software asset management also continues to be an important issue for software users. Software users seek to insure they have appropriate levels of inventory so that return and/or reorder decisions can be made in a timely manner, that developers have adequate quantities of required resources, and so on. Software can be expensive. Thus, software users seek to insure that they received software they ordered and that they only pay for software they actually received.

Conventionally these three enterprise issues, and others, have been addressed individually with little, if any, integration between software license compliance logic, software asset management logic, and accounting logic. These conventional approaches have typically relied on identifiers that have been difficult to correlate, if they can be correlated at all.

An organization may employ a number of people who use a number of computing hardware devices and who run a variety of computing software applications. A discovery logic may be tasked with identifying hardware and software in use or owned by the organization. For example, a spider may crawl through an enterprise network and collect data from a ROM (Read Only Memory) BIOS (Basic Input Output System) associated with a hardware device, from a registry of software associated with a device, and so on. Unfortunately, it may be difficult, if possible at all, to correlate this instance data with license data, asset management data, accounting data, and other data available to the organization concerning the software. For example, a discovery logic may identify that two different programmers are both running an instance of the same application. The application may be identified by conventional systems using a title (e.g., word processor BrandX). However, there may be no way to identify, for example, which purchase order, if any, was used to acquire either instance.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
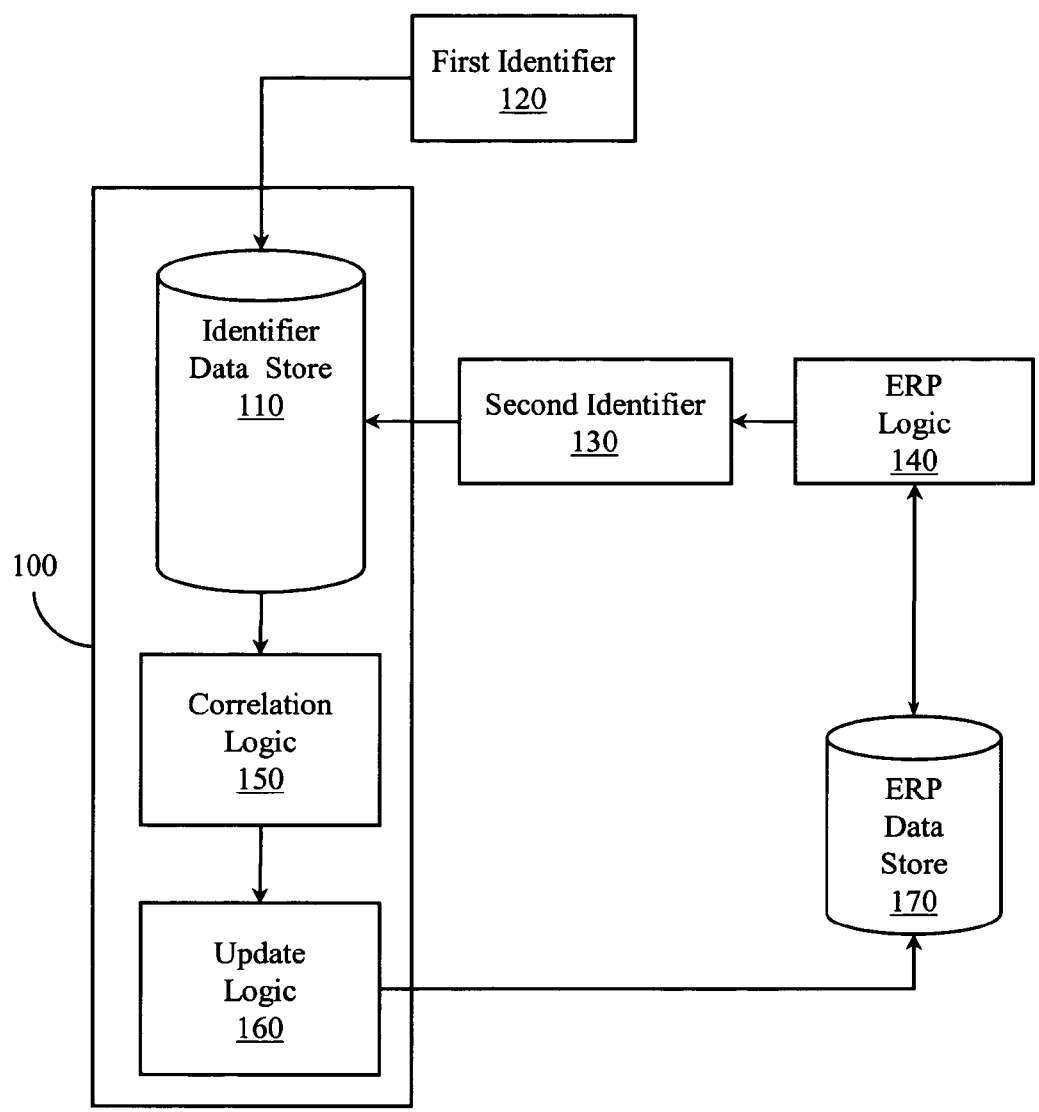
FIG. 1 illustrates an example system associated with software identifier based correlation.

An instance of a software title (e.g., application, operating system) may be tagged with a unique identifier. The identifier may comply with a standard (e.g., ISO 19770-2). The identifier may be discoverable by a discovery logic. The discovery logic may be, for example, a crawler that visits nodes in an enterprise to discover installed software. The discovery may include examining unique identifiers available in installed software. The identifier may be stored, for example, in a software header. The identifier may be, for example, an SKU (stock keeping unit) number, a registration key, a product key, and so on.

The unique identifier may be used to make correlations between different items (e.g., purchase order, invoice, asset management data, inventory data, discovery data) by different logics. By way of illustration, an organization may have an asset management application that stores and manipulates an asset management data set. The asset management data may include data about software titles. "Software title" is used herein to refer to an identifiable piece of software. "Software title" does not refer to the title of a piece of software. A word processor (e.g., SuperWordPro), a spreadsheet (e.g., SuperSpreadSht), an operating system (e.g., SuperOS), and so on may be referred to as software titles. An installed version of a software title may be referred to as an instance of that software title.

An asset management logic may analyze the asset management data set and determine that a number of a software title should be ordered. The asset management data set may include information like the name of a software title, a vendor of the software title, a vendor identifier of the software title, an SKU (stock keeping unit) for the software title, and so on. Based on the decision to purchase more software, a purchase order may be generated and sent to a vendor(s). The vendor may fulfill the order and deliver a package that includes the desired number of copies and an invoice. The invoice may include, for example, an SKU associated with the software title.

Example systems and methods may rely on each instance of the software title being tagged with a unique identifier. Thus, a receiving logic at the organization may establish and maintain a correlation between an instance of a software title tagged with a unique identifier, a purchase order, an invoice, and other records associated with the software title. The correlation may facilitate updating, for example, an asset management data value like "total number of authorized copies purchased." Other asset management data values may also be updated.

An instance of the software title may thereafter be installed at a point in the organization. At some point after installation, a discovery agent may locate the instance of the software. Discovery agents may be internal to the organization (e.g., enterprise owned and controlled crawler, Oracle Enterprise Manager) and/or external (e.g., Altiris, Centennial). Since the instance of the software title is tagged with a unique identifier, the discovery agent may report not just the presence of an instance of the software title, but also the unique identifier. Therefore tighter integration between discovery data, software license compliance data, accounting data, asset management data, and so on, may be achieved.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

FIG. 1 illustrates a system 100 associated with software identifier based correlation. Making the software identifier based correlation facilitates reconciling a physical enterprise state with an ERP (enterprise resource planning) back office system and/or application. The physical enterprise state may describe, for example, instances of software installed in the enterprise. Software may be acquired and installed via different approaches. Data (e.g., unique identifier data) acquired by a discovery logic (e.g., enterprise crawler) may facilitate producing the correlation.

System 100 may include an identifier data store 110 to store a first identifier 120 and a second identifier 130. The first identifier 120 uniquely identifies a discovered instance of a software title installed in an enterprise. A "software title" does not refer to the title of a piece of software but rather is a generic term used to indicate "a piece of software". A software title may be, for example, a word processor, a video game, a spread sheet application, a database application, a browser, a reader program, and so on. An enterprise refers to a collection of related computing devices that are treated as a single logical entity from the point of view of some entity. The related computing devices may be commonly owned and networked together. Thus, in one example, an enterprise may include a set of computers belonging to a company and having access to a company intranet. So, the first identifier 120 may uniquely identify, for example, a word processor installed on a personal computer that belongs to an organization (e.g., company) and that is connected to the company intranet.

The first identifier 120 is discoverable from the discovered instance of the software title. In one example, the first identifier 120 may be provided by a discovery logic. In one example, the discovery logic may be external to the enterprise but may have access to enterprise hardware and/or software. For example, an external auditing body may host a discovery process and perform a discovery procedure. This process and procedure may be hosted external to the enterprise. In another example, the discovery logic may reside within the enterprise and/or belong to the enterprise. A discovery logic is described in greater detail in connection with FIG. 2.

The identifier data store 110 may also store the second identifier 130. The second identifier 130 may identify a known instance of a software title associated with the enterprise. For example, an enterprise may know that it ordered an instance of a software title, may know that the instance was received, and may even know that the instance was installed on a computer in the enterprise. However, acquiring this information in conventional systems may have been difficult, if possible at all. For example, an enterprise may have known that it ordered a piece of software, and may have known that an instance of the software was installed in the enterprise, but may not have been able to determine whether the installed instance was the ordered instance. For example, an enterprise may have ordered a copy of a graphics program but may have never received the copy. The graphics designer who was waiting for the software may have become frustrated and purchased their own copy. The graphics designer may then have installed that copy on his computer. Thus, the enterprise may mistakenly have thought that it received the ordered copy. Example systems and methods described herein facilitate removing this type of uncertainty associated with conventional systems.

The second identifier 130 may be provided from an enterprise resource planning (ERP) data store 170. The ERP data store 170 may store different types of enterprise data. The ERP data store 170 is described in greater detail in connection with FIG. 3. In one example, an ERP logic 140 may provide the second identifier 130 to the identifier data store 110.

System 100 may also include a correlation logic 150 to identify a correlation between the discovered instance and the known instance. The correlation may be based, at least in part, on a relationship between the first identifier 120 and the second identifier 130. The correlation may also be based, at least in part, on a relationship between the first identifier and a piece of ERP data associated with the second identifier. For example, the correlation logic 150 may receive the first identifier 120 and, based on the receive event, decide to examine a set of second identifiers to see whether the discovered instance identified by the first identifier 120 is known to the enterprise. The second identifier 130 provides information from which the correlation can be made. For example, the second identifier 130 may provide information about a purchase order generated by the enterprise. Therefore a correlation between a discovered instance and a purchase order may be made. For example, the correlation logic 150 may identify that the discovered instance was in fact ordered by the enterprise. The correlation logic 150 may also determine a relationship between a discovered instance and an invoice. For example, the correlation logic 150 may identify that the discovered instance was in fact delivered to the enterprise. If the correlation logic 150 has established a correlation between the discovered instance, a purchase order, and an invoice, then the correlation logic 150 may further establish a correlation between a purchase order and an invoice. Additional correlations that facilitate reconciling discovered data with an ERP back-office system are provided in connection with FIG. 3.

System 100 may also include an update logic 160 to selectively update a value in the ERP data store 170. For example, an ERP data store 170 may maintain a count of the number of instances of a specific software title. When the correlation logic 150 determines that a correlation exists between a discovered instance and an instance for which a count is kept in the ERP data store 170, the update logic 160 may update the ERP data store 170 to reflect an additional copy of the software title.

Figure 2:
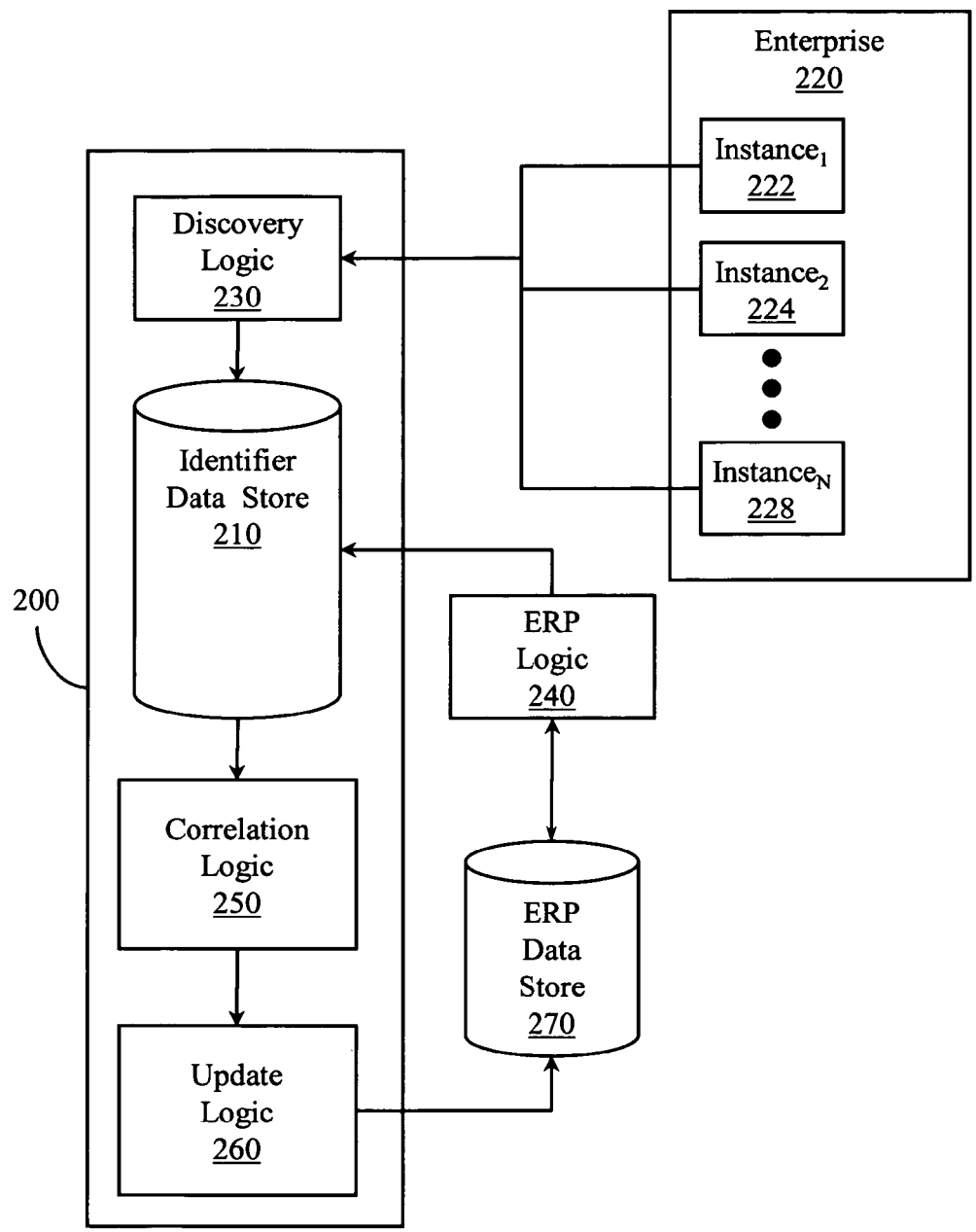
FIG. 2 illustrates another example system associated with software identifier based correlation.

FIG. 2 illustrates a system 200 that includes some elements similar to those described in connection with system 100 (FIG. 1). For example, system 200 includes an identifier data store 210, a correlation logic 250, and an update logic 260. Identifier data store 210 may receive a second identifier from an ERP logic 240. ERP logic 240 may provide the second identifier from an ERP data store 270. System 200 also includes a discovery logic 230 that will provide a first identifier associated with instances of software (e.g., instance$_1$ 222, instance$_2$ 224 ... instance$_N$ 228) located in an enterprise 220.

In one example, discovery logic 230 may be an automated process that crawls the enterprise 220. One skilled in the art will appreciate that the automated process may be, for example, a crawler, a bot, a spider, and so on. In another example, discovery logic 230 may include a set of cooperating logics that are distributed through the enterprise 220. In one example, the cooperating logics may be a set of crawlers that crawl different portions of the enterprise 220 and report on discovered software. In another example, the cooperating logics may be a set of event-driven reporting processes that generate an identifier upon determining that an instance of a software title has been installed, removed, updated, and so on, on a computer in the enterprise 220.

In one example, for discovery logic 230 to provide the first identifier includes first discovering an instance of a software title in enterprise 220 and then examining a software header associated with the discovered instance. The software header may be, for example, an ISO 19770-2 compliant header. In this example, the first identifier may therefore be an ISO 19770-2 compliant identifier. To mitigate issues associated with counterfeiting, hacking, and so on, the first identifier may be a read-only identifier that is manufactured into the software header. Values stored in the first identifier may be, for example, an SKU, a registration number, and a license number. In some examples, the SKU, registration number, license number, and so on, may be provided as the first identifier.

In one example, the ERP logic 240 may be an asset management logic that maintains an inventory of software titles. Thus, the second identifier may identify an entry in the inventory. Therefore, the correlation logic 250 may determine that a correlation exists between the first identifier and the second identifier by examining the inventory from which the second identifier is provided. In this example, the second identifier may be a pointer to the inventory, may be a pointer to an inventory entry, may be a row number associated with an entry in an inventory database table, and so on. When the ERP logic 240 is an asset management logic, the update logic 260 may selectively update the inventory based, at least in part, on the correlation. For example, if the discovery logic 230 provides a first identifier that identifies instance$_1$ 222, and the ERP logic 240 provides a second identifier associated with an inventory of software titles, the correlation logic 250 may determine that no record of instance$_1$ 222 exists in the inventory and therefore update logic 260 may update the inventory by adding a new value for the newly discovered software title. In another example, if the discovery logic 230 provides a first identifier that identifies instance$_2$ 224, and the ERP logic 240 provides a second identifier associated with the inventory of software titles, the correlation logic 250 may determine that a count concerning instance$_2$ 224 needs to be updated and therefore update logic 260 may update that count.

In one example, the ERP logic 240 may be a software license logic that maintains a set of compliance states for a set of software titles. In this example, the second identifier may identify a member of the set of software titles for which a software license compliance state is being maintained. In this example, the update logic 260 may selectively update the set of compliance states based, at least in part, on the correlation. For example, the update logic 260 may determine that too many instances of a certain software title have been discovered in the enterprise 220. In this example, the update logic 260 may update a software license compliance state to indicate that the enterprise is not in compliance with the software license requirements for that software title. Furthermore, the update logic 260 may send notifications to the user of the installed software instance and request that it be uninstalled.

In another example, the ERP logic 240 may be an accounting logic that maintains data associated with a set of purchase orders and data associated with a set of invoices. The accounting logic may be tasked with relating an invoice entry to a purchase order entry. In this example, the second identifier may identify a purchase order entry and/or an invoice entry. In this example, the correlation logic 250 may determine that a discovered instance is an instance that was ordered and invoiced.

Figure 3:
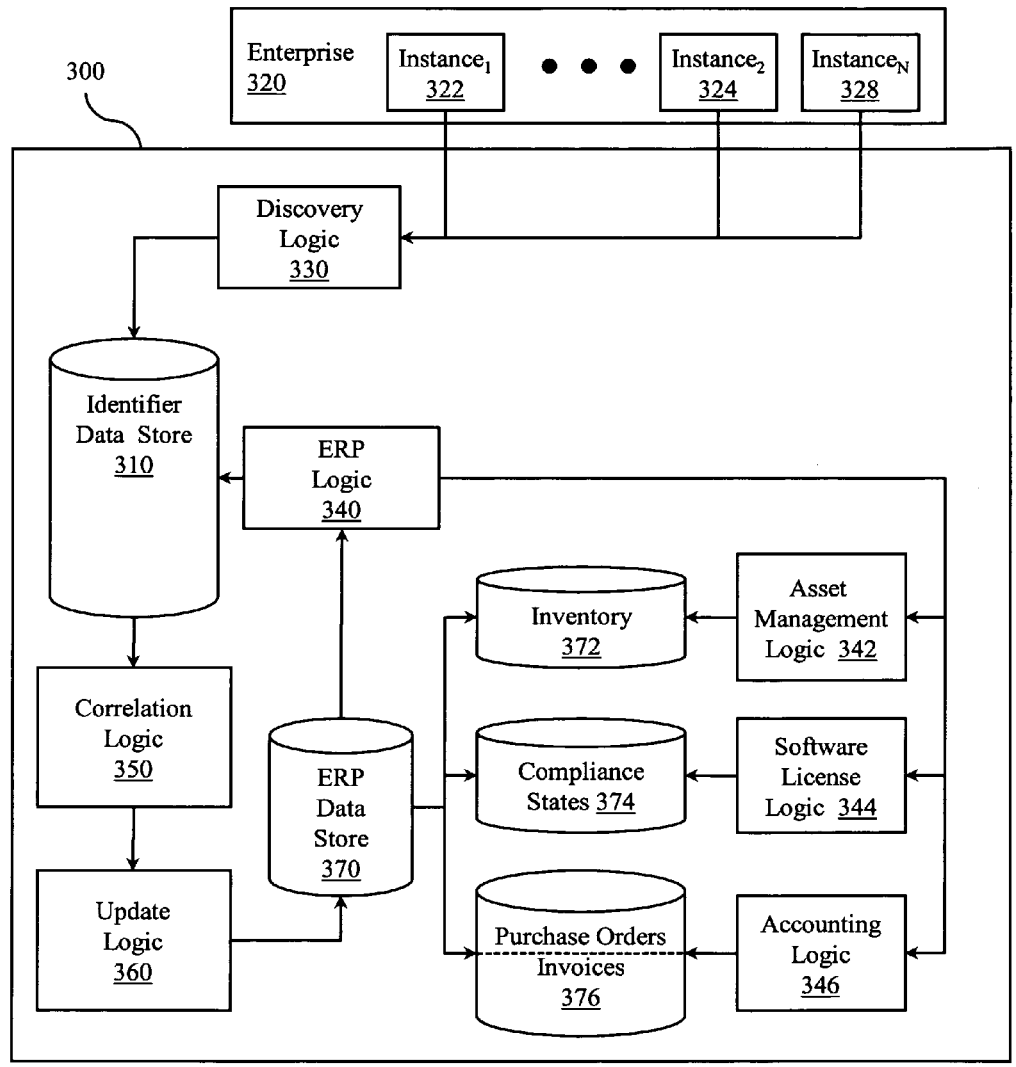
FIG. 3 illustrates another example system associated with software identifier based correlation.

FIG. 3 illustrates a system 300 that includes some of the elements described in connection with system 200 (FIG. 2). For example, system 300 includes an identifier data store 310, a discovery logic 330, a correlation logic 350, and an update logic 360. Discovery logic 330 may provide a first identifier associated with instances (e.g., instance$_1$ 322, instance$_2$ 324 . . . instance$_3$ 328) located in an enterprise 320. However, system 300 includes additional elements. For example, system 300 may include an ERP logic 340 and an ERP data store 370. In one example, ERP data store 370 may include a database table and/or a database.

In system 300, the ERP logic 340 may include an asset management logic 342, a software license logic 344, and an accounting logic 346. While asset management logic 342, software license logic 344, and accounting logic 346 are illustrated outside ERP logic 340 and are illustrated as separate logics, it is to be appreciated that in some examples these logics may reside within logic 340 and may be a single logic. The asset management logic 342 may maintain an inventory 372 of software titles. For example, the asset management logic 342 may maintain a database table(s) that stores a list of software titles discovered in the enterprise 320 and a corresponding count of the number of instances of the software titles. The inventory 372 may also include entries for software titles that are supposed to be present in the enterprise 320. The software license logic 344 may maintain a set of compliance states 374 for members of the inventory 372 of software titles. The set of compliance states 374 may indicate whether enterprise 320 is in compliance with software license requirements for a software title. For example, the compliance states may indicate whether enterprise 320 is running more instances of a software title than it is legally permitted. Additionally, the software license logic 344 may identify that a given software title may be licensed to have multiple installations per user (e.g., laptop copy, desktop copy). Therefore, the software license logic 344 may identify multiple instances of the same software title as being compliant with a multiple personal installation logic. The accounting logic 346 may maintain accounting data 376 associated with a set of purchase orders and a related set of invoices. The accounting logic 346 may be tasked with relating invoice entries to purchase entries. In this example, the second identifier may therefore identify an entry in the inventory 372, an entry in the compliance states 374, and/or an entry in the accounting data 376.

In system 300, the update logic 360 may selectively update the inventory 372, the compliance states 374, and/or the accounting data 376 based, at least in part, on the correlation made by the correlation logic 350. By way of illustration, discovery logic 330 may provide a first identifier that indicates the presence of instance$_1$ 322 in the enterprise 320. The ERP logic 340 may provide a second identifier that identifies values available in inventory 372, compliance states 374, and/or accounting data 376. The correlation logic 350 may determine that instance$_1$ 322 is a title for which the enterprise 320 has a site license. However, the correlation logic 350 may determine that no invoice or purchase order related to this instance exists. Additionally, correlation logic

350 may identify that instance$_1$ 322 puts enterprise 320 over the limit for its site license for the software title. Therefore, update logic 360 may update inventory 372 and compliance states 374 to record the unauthorized instance. Updating compliance states 374 may in turn cause software license logic 344 to raise an alarm concerning the compliance state. For example, software license logic 344 may send an email to a compliance officer identifying that the software license is not compliant and, in the case of an unauthorized user, may provide information concerning instance$_1$ 322 and/or the hardware and/or user associated with instance$_1$ 322. Update logic 360 may also update accounting data 376 which may in turn cause accounting logic 346 to generate a purchase order.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
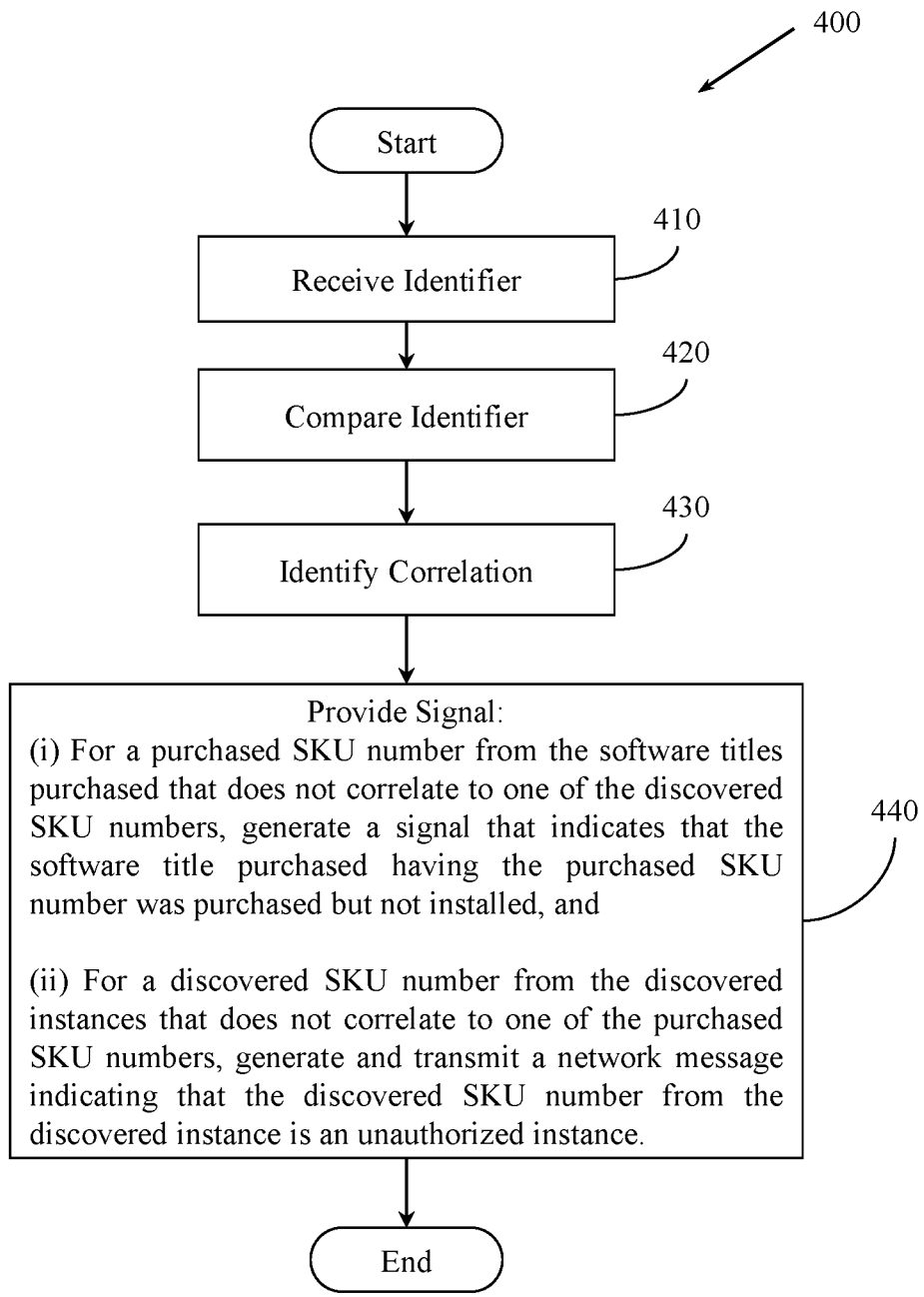
FIG. 4 illustrates an example method associated with software identifier based correlation.

FIG. 4 illustrates an example method associated with software identifier based correlation. Method 400 may include, at 410, receiving an identifier that uniquely identifies a software instance installed in an enterprise. The identifier may be retrieved from the software instance. The identifier may be provided with the software instance. For example, the identifier may be manufactured into a software header associated with the software instance.

Method 400 may also include, at 420, comparing the identifier to a member of a set of enterprise resource planning (ERP) data. The ERP data may include, for example, accounting data, inventory data, software license compliance data, and so on. Comparing the identifier may include, for example, determining whether the identifier is listed in the ERP data, determining whether the identifier is associated with an asset for which data resides in the ERP data, and so on.

Method 400 may also include, at 430, identifying a correlation between the identifier and a member of the set of ERP data. Identifying the correlation may include, for example, identifying that a purchase order exists for an instance of discovered software. Identifying the correlation may also include, for example, identifying that an inventory record exists for an instance of discovered software. Identifying the correlation may also include, for example, identifying that a software license compliance state exists for the discovered instance. While a purchase order, inventory record, and software license compliance state are described, it is to be appreciated that other data and thus other correlations may be employed.

Method 400 may also include, at 440, selectively providing a signal based on the correlation. In one example the signal may control an asset management logic to manipulate a value in an asset inventory. The manipulation may be based, at least in part, on the correlation. The manipulation may include, for example, incrementing a count in an asset inventory based on the correlation identifying that an instance of a known title has been added, adding an entry and initializing a count in an asset inventory based on the correlation identifying that an instance of an unknown title has been added, and so on. In another example, the signal may control a software license logic to manipulate a value in a software license data store. This manipulation may be based, at least in part, on the correlation. By way of illustration, the manipulation may include changing a state from compliant to non-compliant upon determining that too many instances of a software title are present in the enterprise. While enterprise level compliance is described, it is to be appreciated that compliance may be controlled at other levels (e.g., device, employee, group). In another example, the signal may control an accounting logic to manipulate a value relating an asset inventory value to, for example, a purchase order, an invoice, a delivery record, and so on, based, at least in part, on the correlation. For example, a purchase order may be marked "fulfilled" and an invoice may be marked "verified" upon determining that the correlation indicates that an instance that was ordered and invoiced has actually been installed in the enterprise.

While FIG. 4 illustrates various actions occurring in serial, it is to be appreciated that various actions illustrated in FIG. 4 could occur substantially in parallel. By way of illustration, a first process could receive identifiers, a second process could compare identifiers to stored data, a third process could identify correlations between identifier and ERP data, and a fourth process could provide signals based on the correlations. While four processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 400. While executable instructions associated with method 400 are described as being stored on a computer-readable medium, it is to be appreciated that executable instructions associated with other example methods described herein may also be stored on a computer-readable medium.

Figure 5:
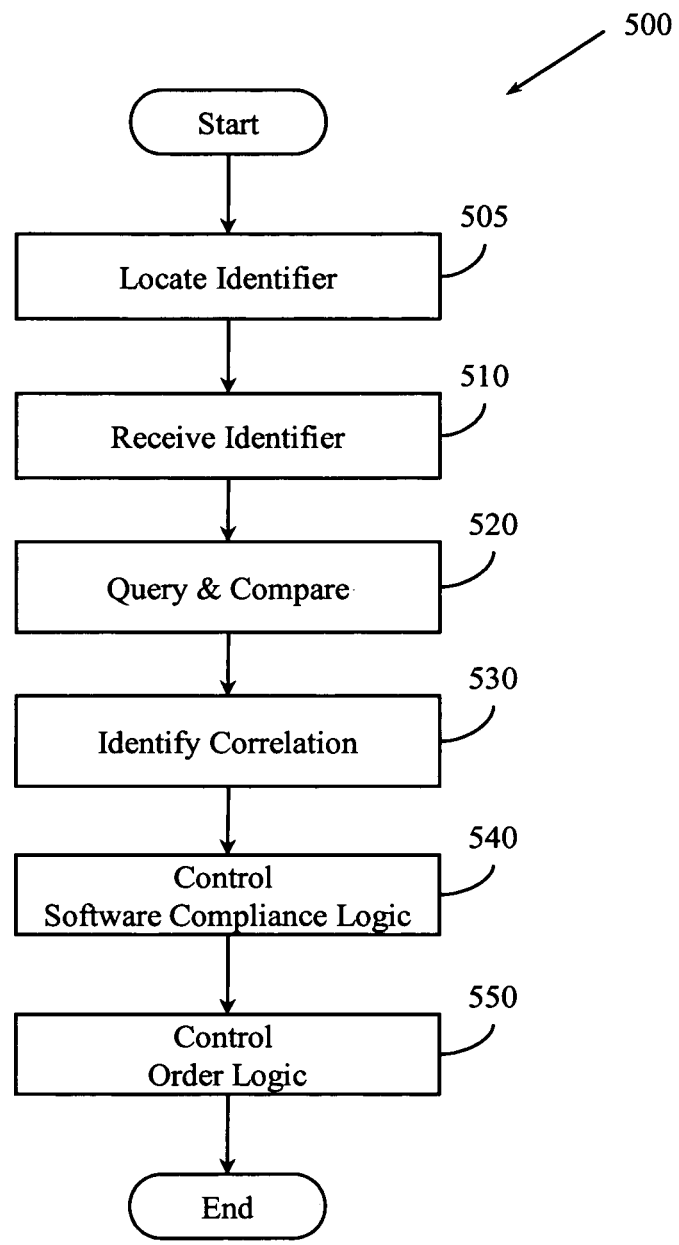
FIG. 5 illustrates another example method associated with software identifier based correlation.

FIG. 5 illustrates a method 500 associated with software identifier based correlation. Method 500 includes some actions similar to those described in connection with method 400 (FIG. 4). For example, method 500 includes receiving an identifier 510 and identifying a correlation 530. However, method 500 includes additional actions and/or further characterizes actions described in method 400.

For example, method 500 includes, at 505, locating the identifier in a software header associated with the instance. The identifier may be, for example, a read-only value permanently installed in the software header at manufacture and/or distribution time. Locating the identifier may include, for example, crawling an enterprise to inspect a registry of installed software, detecting an event that reports that a registry of installed software has been updated, detecting an event that reports that a software image has changed, and so on. The header may be, for example, an ISO 19770-2 compliant header. The identifier may be, for example, an SKU, a registration number, a product identifier, and so on.

In method 500, action 520 is further characterized. In one example, comparing the identifier to the member of a set of ERP data may include querying a database in which the set of ERP data is stored. The query may include the identifier located at 505 and received at 510. The query may be, for example, an SQL query that attempts to determine whether the identifier associated with the discovered instance is known to the enterprise. A subsequent SQL query may then attempt to determine how the discovered instance is known and thus whether any action needs to be taken. The action may include, for example, issuing a software compliance notice, placing an order, and so on.

Thus, method 500 also includes, at 540, controlling a software compliance logic to issue a software compliance notice. The software compliance notice may indicate whether an enterprise is currently complying with its contractual software license requirements. The software compliance may take different forms. For example, the notice may take the form of an email sent to a software compliance officer, may take the form of a telephone call placed to a manager, may take the form of a paper certificate and/or electronic certificate issued on behalf of the enterprise, and so on.

Method 500 also includes, at 550, controlling an order logic to issue a purchase order. If the correlation identified at 530 indicates that an inventory level has fallen below an order threshold, then a purchase order may automatically be generated. Thus, the identifier located at 505 and received at 510 may facilitate integrating enterprise discovery processes with ERP processes including, for example, compliance and inventory control.

Figure 6:
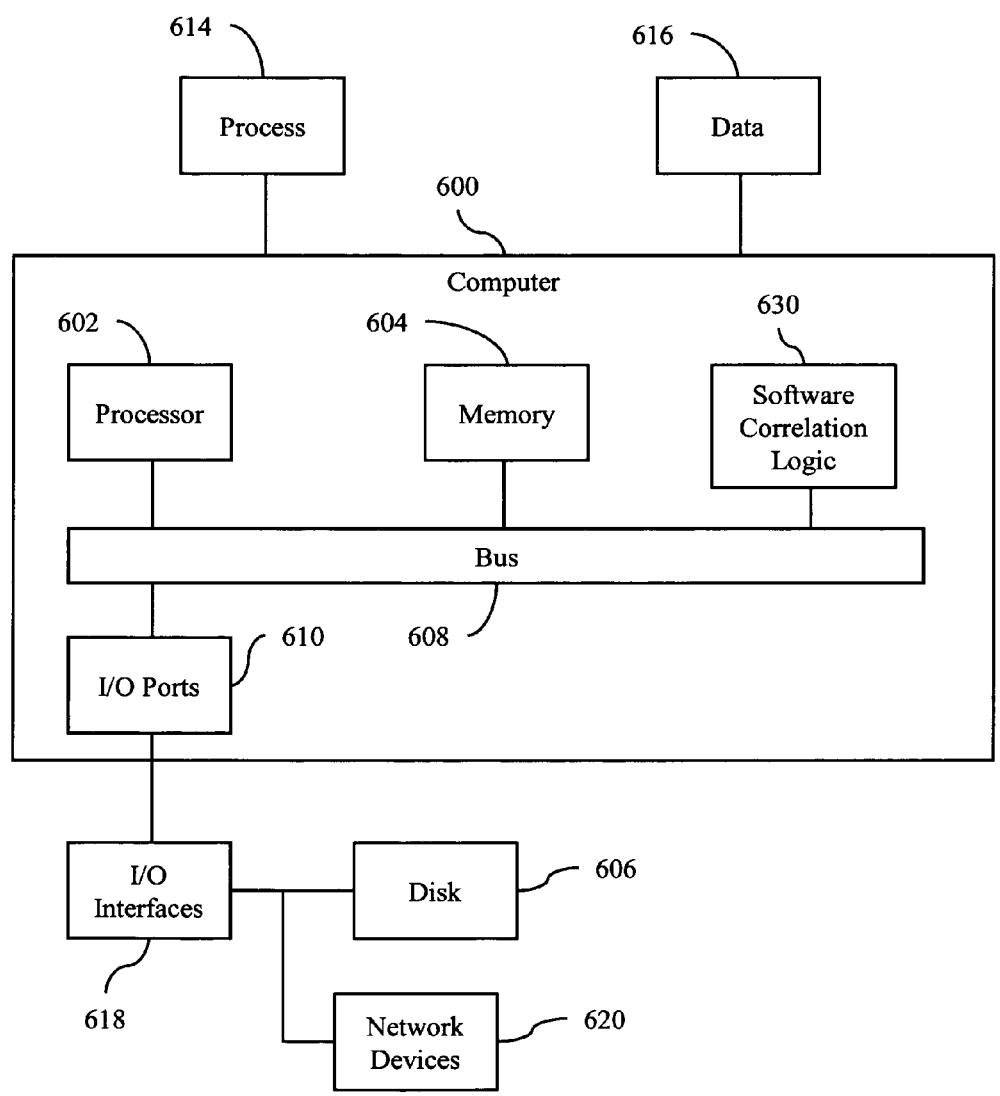
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a software correlation logic 630 configured to facilitate making correlations that reconcile a physical network to ERP data. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for discovering a unique identifier associated with an instance of software installed in an enterprise. The instance may be, for example, a word processor, a spread sheet, a browser, a video game, and so on. The unique identifier may be identified, for example, during a crawl of the enterprise by a discovery process. The unique identifier may also be identified, for example, in response to events occurring in the enterprise. The enterprise events may include, for example, software installation events, software update events, and so on. The unique identifier may be provided with the software instance and may be, for example, an ISO 19770-2 compliant instance.

Logic 630 may also provide means (e.g., hardware, software, firmware) for producing a correlation identifier. The correlation identifier may be produced by comparing the unique identifier to a set of stored identifiers associated with an ERP logic associated with the enterprise. The set of stored identifiers may be populated, for example, by an accounting application, an inventory application, a software compliance application, and so on.

Logic 630 may also include means (e.g., hardware, software, firmware) for selectively controlling the ERP logic based, at least in part, on the correlation identifier. Controlling the ERP logic may include, for example, causing a software compliance value to be updated, causing a purchase order to invoice relation to be updated, and so on.

In one example, a collection of the recited means may be implemented, for example, as an ASIC. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computing system, comprising:
   at least one processor for executing instructions;
   a discovery logic, configured as a first module stored in a non-transitory computer-readable medium, including instructions that when executed by the at least one processor cause the at least one processor to perform an automated process that crawls nodes of an enterprise system via network communications to discover a plurality of instances of software titles that have been installed in the enterprise system, wherein crawling the nodes includes (i) locating and inspecting a registry of installed software titles to discover instances of the installed software titles, (ii) for each discovered instance, locating a software header that prepends a software file associated with the discovered instance, and (iii) identifying a stock keeping unit (SKU) number from each of the discovered instances of software titles by locating and reading the SKU number from a read-only value permanently installed in the software header associated with each discovered instance, wherein the SKU number of a discovered instance is a first identifier that uniquely identifies the discovered instance;
   an enterprise resource planning (ERP) data store contained on computer-readable medium that stores data generated from purchase orders and corresponding invoices that identify stock keeping unit (SKU) numbers for each instance of software titles purchased for the enterprise system wherein the SKU number of each instance of software titles purchased are a second identifier;
   a correlation logic configured as a second module stored in the non-transitory computer-readable medium, including instructions that when executed by the processor cause the at least one processor to perform a function to determine whether a correlation exists between (i) the SKU numbers from the discovered instances that are acquired by the discovery logic from crawling the nodes and reading from the registry, and (ii) the SKU numbers from the purchased software titles stored in the ERP data store, wherein the function includes accessing the ERP data store to retrieve the SKU numbers of the purchased software titles and at least comparing the SKU numbers to the SKU numbers from the discovered instances;
   wherein in response to determining whether the correlation exists:
   (i) for a first SKU number from the purchased software titles retrieved from the ERP data store that does not correlate to one of the SKU numbers from the discovered instances acquired by the discovery logic from crawling the nodes and reading from the registry, the correlation logic is configured to generate and transmit via a computer network a first network message to a first device that indicates that the purchased software title having the first SKU number was purchased but is not installed in the enterprise system; and
   (ii) for a second SKU number from the discovered instances, acquired by the discovery logic from crawling the nodes and reading from the registry, that does not correlate to one of the SKU numbers from the purchased software titles retrieved from the ERP data store, the correlation logic is configured to generate and transmit via the computer network a second network message to a second device that identifies the second SKU number from the discovered instance as an unauthorized instance.

2. The system of claim 1, where the discovery logic has access to the enterprise but is hosted external to the enterprise.

3. The system of claim 1, where the discovery logic comprises a set of cooperating logics distributed to two or more computing components in the enterprise.

4. The system of claim 1, where the discovery logic provides the first identifier in response to detecting an installation of a software title.

5. The system of claim 1, where the software header is an ISO 19770-2 compliant header.

6. The system of claim 1, where the first identifier is an ISO 19770-2 compliant identifier.

7. The system of claim 1, where the first identifier is a read-only identifier.

8. The system of claim 1, wherein the data generated from purchase orders and corresponding invoices and stored in the ERP data store includes, in addition to the SKU number, a registration number, and a license number of the purchased instance of the software title.

9. The system of claim 1, wherein the data generated from purchase orders and corresponding invoices a data inventory of the software titles purchased, where the second identifier identifies an entry in the data inventory, and where update logic is configured to update the data inventory based, at least in part, on results of the correlation.

10. The system of claim 1, where the ERP logic is a software license logic that maintains a set of compliance states for a set of software titles, where the second identifier identifies a member of the set of software titles, and where the update logic selectively updates the set of compliance states based, at least in part, on the correlation.

11. The system of claim 1, wherein the system further includes an accounting logic that maintains a database of the purchase orders and the corresponding invoices that identify the stock keeping unit (SKU) numbers for each instance of software titles purchased by the enterprise.

12. The system of claim 1, further including ERP logic that comprises:
an asset management logic that maintains an inventory of the software titles purchased by the enterprise;
a software license logic that maintains a set of compliance states for one or more members of the inventory of software titles; and
an accounting logic that maintains purchase information, where the purchase information includes a set of the purchase orders and a set of the corresponding invoices and where the accounting logic relates a member of the set of invoices to a member of the set of purchase orders;
and
where the second identifier identifies one or more of, an entry in the inventory, a purchase order entry, and an invoice entry, and
where the update logic selectively updates one or more of, the inventory, and the set of compliance states based, at least in part, on the correlation.

13. A non-transitory computer-readable medium storing computer-executable instructions that are executable by a computer and at least a processor, the instructions comprising instructions for:
executing, by at least the processor, an automated process that crawls nodes of an enterprise system, and discovering a plurality of software instances installed in the nodes of the enterprise system, wherein crawling the nodes includes locating and inspecting a registry of installed software titles;
identifying and retrieving, by at least the processor, a stock keeping unit (SKU) number from each of the discovered software instances of software titles by locating and reading the SKU number from a read-only value permanently installed in a software header that prepends a software file associated with the discovered instance, wherein the SKU number of a discovered instance (a discovered SKU number) is a unique identifier assigned to and stored with each software instance;
in response to retrieving the SKU numbers from the discovered software instances, querying, by at least the processor, a database that contains data generated from purchase orders and corresponding invoices that identify purchased stock keeping unit (SKU) numbers for each instance of software titles purchased for the enterprise system, wherein the querying requests at least the purchased SKU numbers;
comparing the discovered SKU numbers, that are acquired from crawling the nodes and reading from the registry, to the purchased SKU numbers in the database to determine whether a correlation exists, and outputting results of the comparing;
in response to determining that the correlation does not exist for one or more of the SKU numbers,
(i) for a purchased SKU number from the software titles purchased that does not correlate to one of the discovered SKU numbers acquired from crawling the nodes and reading from the registry, generating a signal that indicates that the software title purchased having the purchased SKU number was purchased but not installed in the enterprise; and
(ii) for a discovered SKU number from the discovered instances, acquired from crawling the nodes and reading from the registry, that does not correlate to one of the purchased SKU numbers in the database, generating and transmitting a network message indicating the discovered SKU number from the discovered instance is an unauthorized instance.

14. The non-transitory computer-readable medium of claim 13, further comprising instructions for controlling an asset management logic to manipulate a value in an asset inventory, where the manipulation is based, at least in part, on the results of the comparing.

15. The non-transitory computer-readable medium of claim 13, further comprising instructions for controlling a software license logic to manipulate a value assigned to the discovered SKU number in a software license data store by changing a state from a compliant value to a non-compliant value upon determining that the discovered SKU number from the discovered instances does not correlate to one of the purchased SKU numbers.

16. The non-transitory computer-readable medium of claim 13, further comprising instructions for controlling an accounting logic to manipulate a value relating an asset inventory value to one or more of, a purchase order, and an invoice based, at least in part, on the correlation.

17. The non-transitory computer-readable medium of claim 13, wherein the instructions for querying the database includes querying an enterprise resource planning (ERP) database by requesting an SKU number.

18. The non-transitory computer-readable medium of claim 13, further including instructions for controlling a software compliance logic to issue a software compliance notice that indicates a correlation between the discovered SKU numbers and the purchased SKU numbers in response to the results of the comparing.

19. The non-transitory computer-readable medium of claim 18, further including instructions for controlling an order logic to issue a purchase order for a specified software title in response to the results of the comparing that indicate that an inventory level for the specified software title is below an order threshold, wherein the inventory level is determined from an amount of SKU numbers discovered for the specified software title.

20. The system of claim 1, wherein based on the correlation, when the correlation does exist: for a third SKU number from the discovered instances that does correlate to one of the SKU numbers from the purchased software titles, the correlation logic is configured to electronically mark a purchase order corresponding to the third SKU number as fulfilled.

21. The system of claim 1, wherein the correlation logic is configured to identify the correlation between each of the SKU numbers from the discovered instances and the SKU numbers from the purchased software titles stored in the ERP data store by:
querying the ERP data store with the SKU numbers from the discovered instances to identify whether a purchase order exists for the discovered instances using the SKU numbers.

22. A computer-implemented method performed by at least one computing device using at least one processor, the method comprising:
- crawling, using at least network communications, a plurality of computers of a networked system to search for and discover a plurality of software instances installed in the plurality of computers of the networked system, wherein crawling the plurality of computers includes locating and inspecting a registry of installed software titles;
- identifying and retrieving a stock keeping unit (SKU) number from each of the discovered software instances by locating and reading the SKU number from a read-only value permanently installed in a software header that prepends a software file associated with the discovered instance, wherein the SKU number of a discovered instance (a discovered SKU number) is a unique identifier assigned to and stored with each software instance;
- in response to retrieving the discovered SKU numbers, querying a database that contains data generated from purchase orders and corresponding invoices that identify purchased stock keeping unit (SKU) numbers for each instance of software titles purchased for the networked system, wherein the querying requests at least the purchased SKU numbers from the database;
- comparing, using at least the processor and a memory of the computing device, the discovered SKU numbers, that are acquired from crawling the nodes and reading from the registry, to the purchased SKU numbers in the database to determine whether a correlation exists, and outputting results of the comparing;
- in response to determining that a correlation does not exist for one or more of the SKU numbers:
  - (i) for a purchased SKU number from the software titles purchased that does not correlate to one of the discovered SKU numbers acquired from crawling the nodes and reading from the registry, generating a signal that indicates that the software title purchased having the purchased SKU number was purchased but is not installed in the networked system; and
  - (ii) for a discovered SKU number from the discovered instances, acquired from crawling the nodes and reading from the registry, that does not correlate to one of the purchased SKU numbers in the database, generating and transmitting a network message indicating that the discovered SKU number from the discovered instance is an unauthorized instance.

23. The computer-implemented method of claim 22, wherein the comparing includes correlating the discovered SKU numbers to the purchase orders and the corresponding invoices stored in the database to determine if the discovered SKU numbers are found in the purchase orders or in the corresponding invoices of the purchase orders.

* * * * *